(12) United States Patent
Kochiyama et al.

(10) Patent No.: US 11,413,626 B2
(45) Date of Patent: Aug. 16, 2022

(54) CARBON FIBER CHARGING DEVICE AND ELECTRICAL APPLIANCE HAVING THE SAME

(71) Applicant: Samsung Electronics Co., Ltd., Suwon-si (KR)

(72) Inventors: Yasuhiko Kochiyama, Suwon-si (KR); Kyuho Shin, Suwon-si (KR); Soyoung Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 16/707,553

(22) Filed: Dec. 9, 2019

(65) Prior Publication Data

US 2020/0188930 A1 Jun. 18, 2020

(30) Foreign Application Priority Data

Dec. 14, 2018 (KR) .................. 10-2018-0161912

(51) Int. Cl.
  *B03C 3/41* (2006.01)
  *B03C 3/38* (2006.01)
  *B03C 3/60* (2006.01)

(52) U.S. Cl.
  CPC .................. *B03C 3/41* (2013.01); *B03C 3/38* (2013.01); *B03C 3/60* (2013.01); *B03C 2201/04* (2013.01)

(58) Field of Classification Search
  CPC combination set(s) only.
  See application file for complete search history.

(56) References Cited

U.S. PATENT DOCUMENTS

| 4,729,057 A | 3/1988 | Halleck |
| 6,522,055 B2 | 2/2003 | Uemura et al. |
| 6,652,923 B2 | 11/2003 | Uemura et al. |

(Continued)

FOREIGN PATENT DOCUMENTS

| CN | 1309408 A | 8/2001 |
| CN | 101390189 A | 3/2009 |

(Continued)

OTHER PUBLICATIONS

Extended European Search Report dated Apr. 20, 2020, issued in European Application No. 19215190.0.

(Continued)

*Primary Examiner* — Christopher P Jones
*Assistant Examiner* — Sonji Turner
(74) *Attorney, Agent, or Firm* — Jefferson IP Law, LLP

(57) ABSTRACT

A carbon fiber charging device and an electrical appliance therefor are provided. The carbon fiber charging device includes a carbon fiber electrode configured to generate electrons and charge surrounding dust, a protective case configured to cover the carbon fiber electrode such that a foreign object having a size of a human finger is not able to contact the carbon fiber electrode, the protective case including a top wall facing a tip of the carbon fiber electrode and provided with a through hole and a side wall surrounding an outer circumferential surface of the carbon fiber electrode, and an electron generation stabilization device provided in the protective case and configured to allow the carbon fiber electrode to generate electrons stably.

19 Claims, 20 Drawing Sheets

(56) References Cited

U.S. PATENT DOCUMENTS

| | | | |
|---|---|---|---|
| 7,497,898 B2* | 3/2009 | Sato | B03C 3/383 |
| | | | 96/43 |
| 7,847,232 B2 | 12/2010 | Shimoi et al. | |
| 8,699,231 B2 | 4/2014 | Shinoda | |
| 8,834,799 B2* | 9/2014 | Loreth | A61L 9/22 |
| | | | 422/121 |
| 9,263,858 B2* | 2/2016 | Lee | H01T 23/00 |
| 9,340,168 B2 | 5/2016 | Shinoda | |
| 9,746,192 B2* | 8/2017 | Lee | F24F 1/008 |
| 9,875,873 B2* | 1/2018 | Ueno | G01N 27/62 |
| 10,245,593 B2* | 4/2019 | Wallin | B03C 3/155 |
| 10,537,901 B2* | 1/2020 | Lee | B03C 3/41 |
| 10,748,733 B2* | 8/2020 | Nishida | B60H 3/0071 |
| 10,910,186 B2* | 2/2021 | Nishida | H01T 23/00 |
| 2001/0028209 A1 | 10/2001 | Uemura et al. | |
| 2003/0013372 A1 | 1/2003 | Uemura et al. | |
| 2009/0009077 A1 | 1/2009 | Shimoi et al. | |
| 2011/0211311 A1 | 9/2011 | Shinoda | |
| 2013/0335919 A1 | 12/2013 | Shinoda | |
| 2014/0009860 A1 | 1/2014 | Lee et al. | |
| 2019/0070546 A1* | 3/2019 | Lee | B03C 3/368 |
| 2020/0109869 A1* | 4/2020 | Makipaa | B01D 46/0036 |
| 2020/0188830 A1* | 6/2020 | Shin | B03C 3/41 |

FOREIGN PATENT DOCUMENTS

| | | | |
|---|---|---|---|
| CN | 102170764 A | 8/2011 | |
| CN | 104154591 A | 11/2014 | |
| CN | 104508387 A | 4/2015 | |
| EP | 2 683 042 A2 | 1/2014 | |
| EP | 2 803 916 A1 | 11/2014 | |
| JP | 2010-029827 A | 2/2010 | |
| KR | 10-1032613 B1 | 5/2011 | |
| KR | 10-1183945 A | 9/2012 | |
| KR | 10-2014-0147500 A | 12/2014 | |
| KR | 10-2018-0008063 A | 1/2018 | |
| KR | 10-2018-0008064 A | 1/2018 | |
| KR | 10-2018-0022063 A | 3/2018 | |
| WO | 2014/185701 A1 | 11/2014 | |
| WO | WO-2014185682 A1 * | 11/2014 | F24F 8/30 |
| WO | 2016/006906 A1 | 1/2016 | |

OTHER PUBLICATIONS

Chinese Office Action dated Sep. 23, 2021, issued in Chinese Patent Application No. 201911298797.7.

* cited by examiner

CARBON FIBER CHARGING DEVICE AND ELECTRICAL APPLIANCE HAVING THE SAME

CROSS-REFERENCE TO RELATED APPLICATION(S)

This application is based on and claims priority under 35 U.S.C. § 119 of a Korean patent application number 10-2018-0161912, filed on Dec. 14, 2018, in the Korean Intellectual Property Office, the disclosure of which is incorporated by reference herein in its entirety.

BACKGROUND

1. Field

The disclosure relates to a carbon fiber charging device used in an electrostatic dust collecting device and an electrical appliance having the same.

2. Description of Related Art

Electrostatic dust collecting devices are used to remove particulate contaminants such as dust in contaminated air to make clean air.

An example of an electric dust collecting device which collects contaminants by charging contaminants using a high voltage is shown in FIG. 1.

FIG. 1 is a view illustrating an electric dust collecting device according to the related art.

Referring to FIG. 1, an electric dust collecting device 500 includes a charging part 510 and a dust collecting part 520 disposed downstream of the charging part 510.

The charging part 510 is composed of a discharging electrode 511 and a pair of ground plates 513. The discharging electrode 511 is formed as a wire electrode provided at the center of the pair of ground plates 513. A tungsten wire is generally used as the discharging electrode 511. The pair of ground plates 513 are provided on the upper and lower sides of the discharging electrode 511. When a high voltage is applied between the discharging electrode 511 and the ground plates 513, a corona discharge is generated in the discharging electrode 511, and a hemispherical electric field is formed between the discharging electrode 511 and the ground plates 513.

The dust collecting part 520 has a structure in which a plurality of flat positive electrodes 521 and a plurality of flat negative electrodes 522 are stacked at regular intervals. Therefore, when a predetermined voltage is applied between the positive electrode 521 and the negative electrode 522 of the dust collecting part 520, an electric field is formed between the positive electrode 521 and the negative electrode 522.

Accordingly, when air moved by an air moving device (not illustrated) passes through the charging part 510, contaminants in the air are charged to have a positive (+) polarity. The contaminants charged to have a positive polarity are attached to the negative electrode 522 and removed from the air while passing through the dust collecting part 520. Therefore, the dust collecting part 520 discharges clean air from which the contaminants are removed.

However, in the electric dust collecting device 500 using the corona discharge as described above, power consumption is large, and a large amount of ozone is generated due to the corona discharge. An ozone treatment apparatus may be provided to solve the problem of ozone, but this raises the manufacturing cost of the dust collecting device.

Further, in order to solve such a problem, a dust collecting device for charging contaminants by using a carbon fiber as an electrode has been developed and used. However, in the dust collecting device using the carbon fiber, the emission of electrons is unstable and there is a fear that a person may be subjected to electric shock when he or she comes into contact with the tip of the carbon fiber.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a carbon fiber charging device which can prevent a person from being subjected to electric shock by contacting a carbon fiber and stably generate electrons to charge contaminants and an electrical appliance having the same.

Additional aspects will be set forth in part in the description which follows and, in part, will be apparent from the description, or may be learned by practice of the presented embodiments.

In accordance with an aspect of the disclosure, a carbon fiber discharging device is provided. The carbon fiber discharging device includes a carbon fiber electrode configured to generate electrons and charge surrounding dust, a protective case configured to cover the carbon fiber electrode such that a foreign object having a size of a human finger is not able to contact the carbon fiber electrode, the protective case including a top wall facing a tip of the carbon fiber electrode and provided with a through hole and a side wall surrounding an outer circumferential surface of the carbon fiber electrode, and an electron generation stabilization device provided in the protective case and configured to allow the carbon fiber electrode to generate electrons stably.

The through hole of the protective case may be formed in a circular cross-section, and a diameter of the through hole may be 6 mm or less.

A distance between an outer surface of the top wall of the protective case and the tip of the carbon fiber electrode may be at least 2 mm.

The electron generation stabilization device may include an inclined surface provided in an inner side surface of the through hole and inclined to diverge toward an outside of the protective case.

An inclination angle of the inclined surface of the through hole may be in a range of 10 degrees to 15 degrees.

The electron generation stabilization device may include a ground electrode disposed in a vicinity of the carbon fiber electrode.

The ground electrode may be disposed in a ring area around the carbon fiber electrode having a radius of about 4 times to about 8 times a voltage applied to the carbon fiber electrode.

The electron generation stabilization device may include a charge prevention coating layer formed on the top wall of the protective case.

A surface resistance of the charge prevention coating layer on the top wall of the protective case may be in a range of about $10^5$ to $10^{11}$ Ω/sq.

The electron generation stabilization device may include a ventilation path formed in the protective case in communication with the through hole of the top wall so that outside air flows through the ventilation path.

The ventilation path may include an opening formed in a support member, on which the carbon fiber electrode is disposed, fixed to a lower end of the protective case and a side opening provided on the side wall of the protective case.

The carbon fiber charging device may include a fixing ring provided between the carbon fiber electrode and the protective case, and the fixing ring is configured to fix the carbon fiber electrode to the side wall of the protective case, wherein the ventilation path may be formed as a plurality of slots formed in a longitudinal direction of the protective case in the fixing ring.

The electron generation stabilization device may include an air supply portion configured to forcibly supply air to the carbon fiber electrode through the ventilation path.

The electron generation stabilization device may include a high voltage applying part configured to apply a high voltage to the carbon fiber electrode, and a processor configured to control the high voltage applying part to block the high voltage applied to the carbon fiber electrode at a predetermined time interval after the high voltage applying part applies the high voltage to the carbon fiber electrode.

The electron generation stabilization device may include a switching portion electrically connected to the carbon fiber electrode, a high voltage applying part electrically connected to the switching portion and configured to apply a high voltage to the carbon fiber electrode, a ground electrically connected to the switching portion, and at least one processor connected to the switching portion and configured to control the switching portion so that the carbon fiber electrode is selectively connected to one of the high voltage applying part and the ground, wherein the at least one processor is configured to control the switching portion so that the carbon fiber electrode is connected to the high voltage applying part, and then the connection between the carbon fiber electrode and the high voltage applying part is blocked and the carbon fiber electrode is connected to the ground at a predetermined time interval.

In accordance with another aspect of the disclosure, an electrical appliance is provided. The electrical appliance includes a main body including an inlet, a carbon fiber charging device disposed an edge of the inlet and configured to charge contaminants contained in air flowing into the inlet, an air moving device provided inside the main body and configured to vacuum air containing contaminants through the inlet and discharge the air to an outside of the main body, a dust collecting device disposed in an air passage through which air vacuumed by the air moving device provided inside the main body passes, and configured to collect contaminants charged by the carbon fiber charging device from the air, wherein the carbon fiber charging device may include a carbon fiber electrode configured to generate electrons and charge contaminants, a protective case including a top wall facing a tip of the carbon fiber electrode and provided with a through hole and a side wall surrounding an outer circumferential surface of the carbon fiber electrode, the protective case being fixed to the main body, and an electron generation stabilization device provided in the protective case and configured to allow the carbon fiber electrode to generate electrons stably.

The electron generation stabilization device may include an inclined surface provided on an inner side surface of the through hole of the protective case and inclined to diverge outward, and a ventilation path formed in a lower portion of the protective case to communicate with the through hole of the top wall, wherein outside air flows through the ventilation path.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
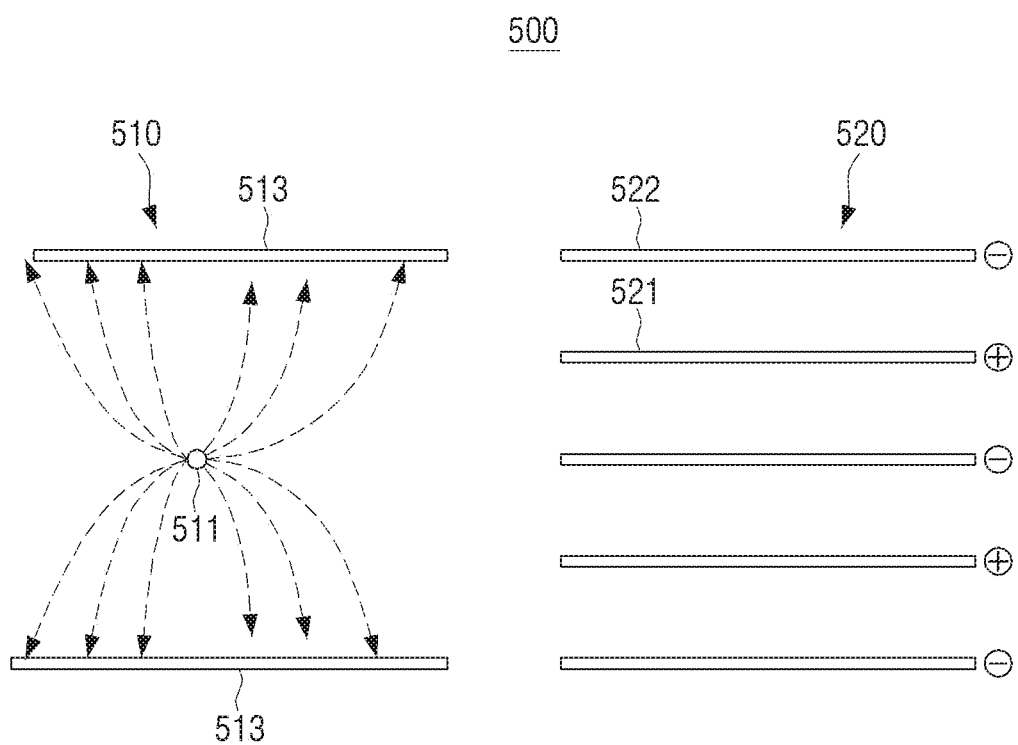
FIG. 1 is a view illustrating an electric dust collecting device according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope of the disclosure, the first element may be called the second element, and the second element may be called the first element in a similar manner.

The terms used in the disclosure are used to merely describe various examples, but is not intended to limit the scope of other examples. In the disclosure, a singular expression may include a plural expression unless specially described. All terms (including technical and scientific terms) used in the disclosure could be used as commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. Even the wordings that are defined in the disclosure must not be interpreted to exclude all examples of the disclosure.

Hereinafter, an electrical appliance having a carbon fiber charging device according to an embodiment of the disclosure will be described in detail with reference to accompanying drawings.

FIG. 1 is a view illustrating an electric dust collecting device according to the related art.

Figure 2:
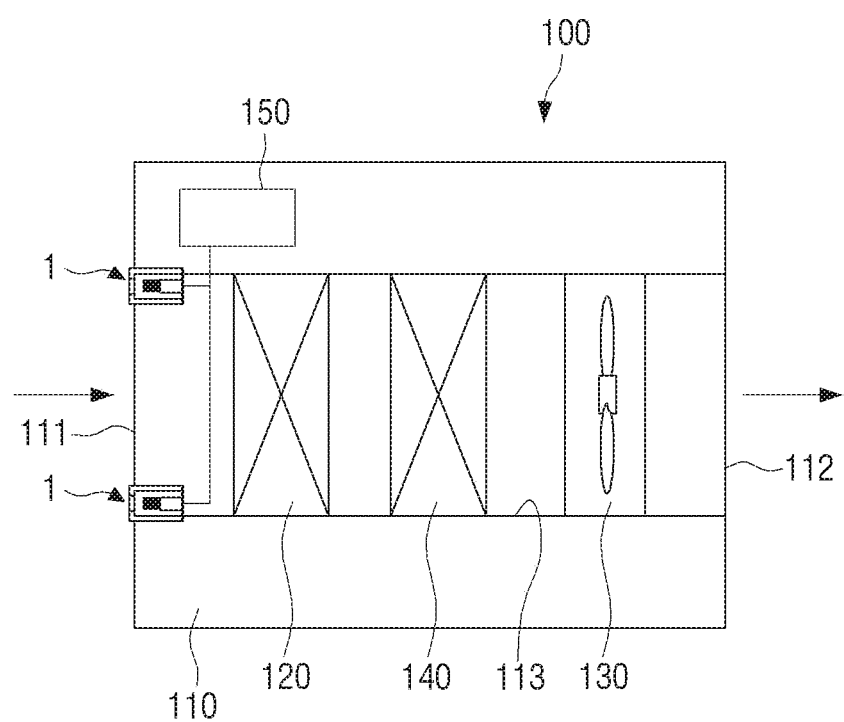
FIG. 2 is a view conceptually illustrating an electrical appliance having a carbon fiber charging device according to an embodiment of the disclosure.

FIG. 2 is a view conceptually illustrating an electrical appliance having a carbon fiber charging device according to an embodiment of the disclosure.

Referring to FIG. 2, an electrical appliance 100 having a carbon fiber charging device according to an embodiment of the disclosure may include a main body 110, a carbon fiber charging device 1, an air moving device 130, and a dust collecting device 120.

The main body 110 forms an outer appearance of the electrical appliance 100 and may have various shapes depending on the type of the electrical appliance 100. The electrical appliance 100 may be any one of an air purifier, an air conditioner, a dehumidifier, a humidifier, a clothes manager, a refrigerator, a dryer, and the like. The main body 110 may be provided with an inlet 111 through which outside air is sucked, an outlet 112 through which the sucked air is exhausted, and an air passage 113 connecting the inlet 111 and the outlet 112.

The carbon fiber charging device 1 is disposed near the inlet 111 of the main body 110 and is configured to charge contaminants such as dust contained in the air being sucked into the inlet 111 using carbon fibers. A plurality of carbon fiber charging devices 1 may be disposed at the edge of the inlet 111. The number and arrangement of the carbon fiber charging devices 1 may be appropriately defined depending on the shape and size of the inlet 111 of the main body 110 such that the carbon fiber charging devices 1 discharge electrons to the entire air flowing into the inlet 111 of the main body 110 to charge contaminants contained in the air. The configuration of the carbon fiber charging device 1 will be described in detail below.

The air moving device 130 is disposed inside the main body 110 and is configured to suck outside air containing contaminants through the inlet 111 and to exhaust the outside air to the outside of the main body 110. In other words, when the air moving device 130 operates, air containing contaminants is introduced into the inlet 111 of the main body 110, flows along the air passage 113, and is exhausted through the outlet 112. The air moving device 130 may use a fan that can generate a suction force capable of sucking air.

The dust collecting device 120 is disposed in the air passage 113 provided inside the main body 110 and is configured to collect the contaminants charged by the carbon fiber charging devices 1 from the air sucked by the air moving device 130. For example, the dust collecting device 120 may include a plurality of dust collecting plates (not illustrated) spaced by a predetermined distance apart from each other and a dust collecting voltage applier (not illustrated) configured to apply a high voltage to the plurality of dust collecting plates. When a high voltage is applied to the plurality of dust collecting plates by the dust collecting voltage applier, the contaminants charged in combination with electrons generated in the carbon fiber charging device 1 may be collected on the plurality of dust collecting plates. Therefore, because the contaminants contained in the sucked outside air are removed by the dust collecting device 120, cleaned air is exhausted from the dust collecting device 120.

The carbon fiber charging devices 1, the dust collecting device 120, and the air moving device 130 as described above may constitute an electrostatic dust collecting device.

The main body 110 may further include a processing part 140 that performs a predetermined process on the sucked air. For example, when the electrical appliance 100 is implemented as an air conditioner, the main body 110 may be provided with a heat exchanger capable of performing heat exchange with the sucked air as the processing part 140. When the electrical appliance 100 is a dehumidifier, the main body 110 may be provided with a dehumidifying device capable of removing moisture from the sucked air as the processing part 140. In addition, when the electrical appliance 100 is a humidifier, the main body 110 may be provided with a humidifying device capable of adding moisture to the sucked air as the processing part 140.

In the case where the electrical appliance 100 is an air cleaner using carbon fiber charging devices according to an embodiment of the disclosure, the processing part 140 may not exist in the main body 110.

When the electrical appliance 100 is a clothes manager, a refrigerator, a dryer, or the like, to which the electrostatic dust collecting device having carbon fiber charging devices according to an embodiment of the disclosure is additionally provided, the processing part 140 may not be included inside the main body 110.

Hereinafter, the carbon fiber charging device 1 according to an embodiment of the disclosure will be described in detail with reference to FIGS. 3 and 4.

Figure 3:
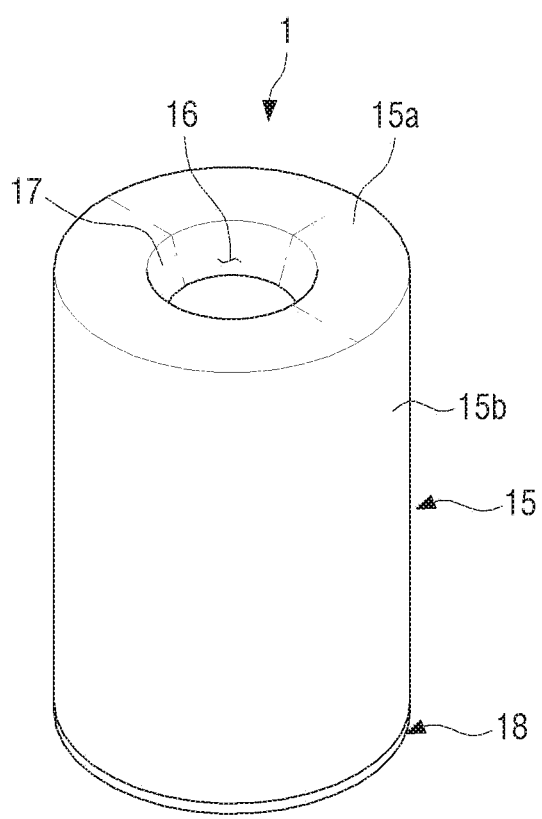
FIG. 3 is a perspective view illustrating a carbon fiber charging device according to an embodiment of the disclosure.

FIG. 3 is a perspective view illustrating a carbon fiber charging device according to an embodiment of the disclosure.

Figure 4:
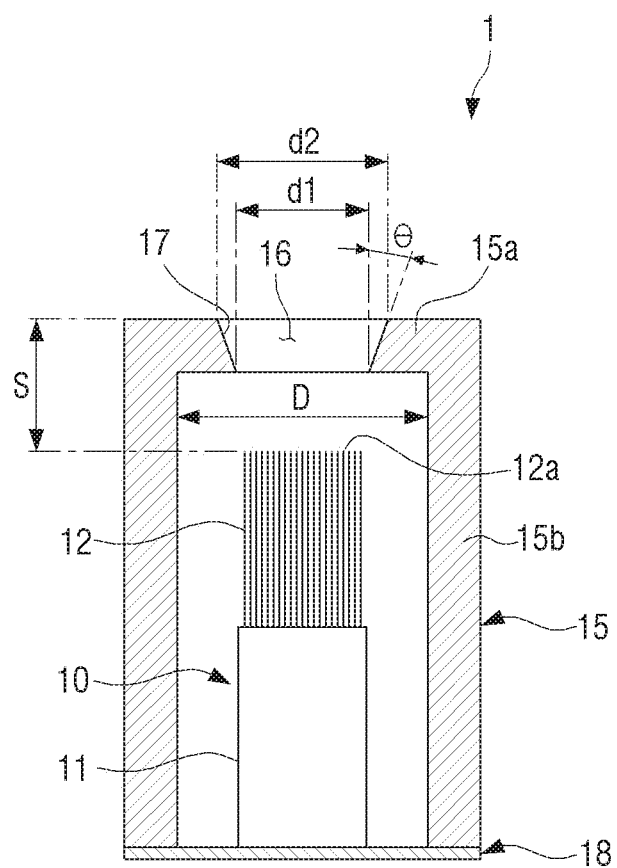
FIG. 4 is a cross-sectional view illustrating the carbon fiber charging device of FIG. 3 according to an embodiment of the disclosure.

FIG. 4 is a cross-sectional view illustrating the carbon fiber charging device of FIG. 3 according to an embodiment of the disclosure.

Referring to FIGS. 3 and 4, the carbon fiber charging device 1 according to an embodiment of the disclosure may include a carbon fiber electrode 10, a protective case 15, and an electron generation stabilization device 17.

The carbon fiber electrode 10 is formed to discharge electrons to the air sucked into the inlet 111 of the main body 110 to charge contaminants, and may include a plurality of carbon fibers 12 and a fixed rod 11.

The plurality of carbon fibers 12 are fixed to one end of the fixed rod 11 in the form of a bundle. In other words, the plurality of carbon fibers 12 may have a brush shape. The plurality of carbon fibers 12 are spaced apart from each other so as not to contact each other. Each of the plurality of carbon fibers 12 may be formed to have a diameter of about 64 μm to about 8 μm.

When a high voltage is applied to the plurality of carbon fibers 12 by the high voltage applier 150 (e.g., a high voltage applying part) (see FIG. 2), electrons are emitted from the tips of the plurality of carbon fibers 12 and charge contaminants contained in the air. In other words, the electrons $e^-$ emitted from the tips of the plurality of carbon fibers 12 are combined with contaminants c to charge the contaminants to become anions (negative ions) $c^-$ ($e^-+c=c^-$).

The fixed rod 11 fixes and supports the plurality of carbon fibers 12, and may be formed in a substantially cylindrical shape. The fixed rod 11 may be formed of a conductive metal material. The fixed rod 11 may be fixed to a wire or a support member 18 for supplying a high voltage applied to the plurality of carbon fibers 12. The support member 18 may be formed in a printed circuit board provided with a power line for supplying power to the fixed rod 11. In the embodiment of the disclosure as illustrated in FIGS. 3 and 4, the fixed rod 11 is fixed to the support member 18 and the high voltage applier 150 is electrically connected to the support member 18. Therefore, one end of the fixed rod 11 is fixed to the support member 18, and the plurality of carbon fibers 12 are fixed to the other end of the fixed rod 11.

In this embodiment, the fixed rod 11 is formed in a cylindrical shape having a circular cross-section, but the shape of the fixed rod 11 is not limited thereto. The fixed rod 11 may be formed in various shapes as long as it can fix and support the plurality of carbon fibers 12. As another example, the fixed rod 11 may be formed in a columnar shape having a cross-section of a polygonal shape such as a quadrangle, a pentagon, and the like, or an elliptical shape.

The protective case 15 is formed to cover the carbon fiber electrode 10 and to prevent a finger of a person from contacting the carbon fiber electrode 10. For example, the protective case 15 may include a top wall 15a facing the tip 12a of the carbon fiber electrode 10 and provided with a through hole 16 and a side wall 15b surrounding the outer circumferential surface of the carbon fiber electrode 10. In other words, the protective case 15 may be formed in a hollow cylindrical shape whose one end is open. Therefore, the carbon fiber electrode 10 is disposed in the inner space of the protective case 15. However, the protective case 15 is not limited to the cylindrical shape. The protective case 15 may be formed to have various cross-sectional shape as long as they can accommodate the carbon fiber electrode 10.

The top wall 15a of the protective case 15 is configured to function as a shield plate that prevents a person's hand or finger from contacting the carbon fiber electrode 10 to which a high voltage is applied, and includes the through hole 16 through which electrons generated from the carbon fiber electrode 10 may be emitted. The through hole 16 may have a diameter d1 of 6 mm or less so as to prevent the user's finger from being inserted thereinto. For example, the diameter d1 of the through hole 16 may be about 5 to 6 mm.

In addition, the inner surface of the top wall 15a of the protective case 15 is formed so as not to contact the tip 12a of the carbon fiber electrode 10. In order to prevent electric shock of the user, the distance S between the outer surface of the top wall 15a of the protective case 15 and the tip 12a of the carbon fiber electrode 10 may be at least 2 mm.

One or more through hole 16 may be formed. In other words, the protective case 15 as illustrated in FIGS. 3 and 4 has a single through hole 16 formed in the top wall 15a. Alternatively, two or more through holes 16 may be formed in the top wall 15a of the protective case 15.

Figure 5:
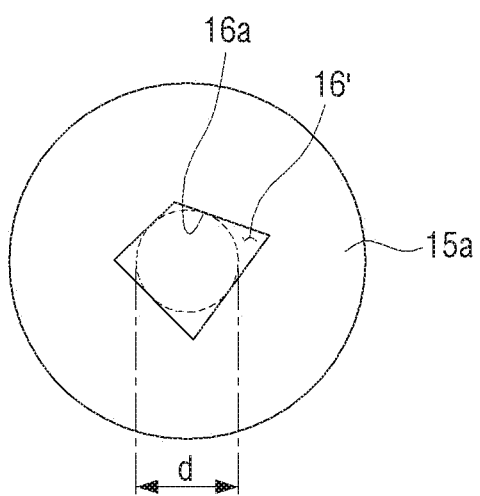
FIG. 5 is a plan view illustrating a modification of the carbon fiber charging device of FIG. 3 according to an embodiment of the disclosure.

In addition, the through hole 16 of the top wall 15a of the protective case 15 as illustrated in FIG. 3 is formed to have a circular cross-section; however, the cross-section of the through hole 16 is not limited thereto. The through hole 16 may be formed in various shapes as long as they can allow electrons generated from the carbon fiber electrode 10 to be emitted and prevent the user's finger from being inserted. For example, as illustrated in FIG. 5, the through hole 16' may be formed to have a quadrangular cross-section. In this case, the diameter d of the inscribed circle 16a of the quadrangular cross-section may be 6 mm or less to prevent the user's finger from being inserted.

FIG. 5 is a plan view illustrating a modification of the carbon fiber charging device of FIG. 3 according to an embodiment of the disclosure.

Although not illustrated, the through hole 16 may be formed in a polygonal cross-section such as a pentagon, a hexagon, etc., an elliptical cross-section, or the like. Also, in this case, the diameter of the inscribed circle of the through hole 16 may be 6 mm or less.

The support member 18 to which the carbon fiber electrode 10 is fixed may be disposed at the lower end of the protective case 15.

The electron generation stabilization device 17 may be configured to allow the carbon fiber electrode 10 to stably generate electrons and may be implemented in various ways.

In the embodiment as illustrated in FIGS. 3 and 4, the electron generation stabilization device 17 may be provided in an inner side surface of the through hole 16 of the protective case 15 and may be formed as an inclined surface inclined to diverge toward the outside of the protective case 15. In other words, the through hole 16 of the top wall 15*a* of the protective case 15 may be formed in a truncated cone shape that diverges away from the tip 12*a* of the carbon fiber electrode 10. For example, the lower diameter d1 of the through hole 16 formed on the inner surface of the top wall 15*a* of the protective case 15 adjacent to the tip 12*a* of the carbon fiber electrode 10 may be formed to be smaller than the upper diameter d2 of the through hole 16 formed on the outer surface of the top wall 15*a*. In this case, the lower diameter d1 of the through hole 16 may be about 6 mm or less in order to prevent the user's finger from being inserted into the protective case 15 through the through hole 16.

In the case that the inner side surface of the through hole 16 of the top wall 15*a* of the protective case 15 is formed with the inclined surface 17 diverging toward the outside as described above, when the inner side surface of the through hole 16 is charged with the same unit area charge density, a potential gradient is formed so that the far side from the tip 12*a* of the carbon fiber electrode 10 becomes a low potential. Therefore, electrons generated in the carbon fiber charging device 1 may be stably emitted to the outside of the protective case 15 through the through hole 16 by the potential gradient. However, when the potential gradient is too small, the function of emitting electrons is not effective. When the potential gradient is too large, it is difficult to reduce the size of the through hole 16, so that it is difficult to prevent the user from receiving an electric shock. Therefore, the inclination angle $\theta$ of the inner side surface 17 of the through hole 16 may be defined as about 10 degrees to about 15 degrees.

Figure 6:
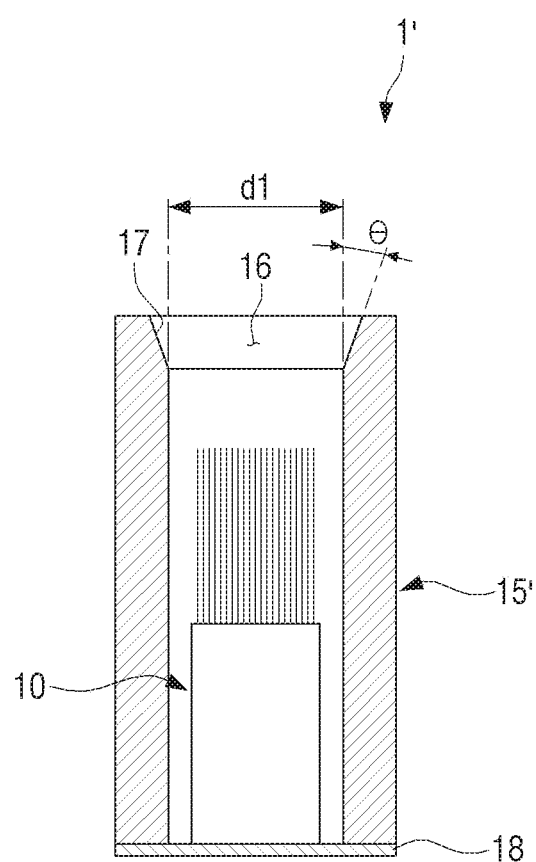
FIG. 6 is a cross-sectional view illustrating a modification of the carbon fiber charging device of FIG. 3 according to an embodiment of the disclosure.

In FIG. 4, the inner diameter D of the side wall 15*b* of the protective case 15 is larger than the inner diameter d1 of the through hole 16. However, the relationship between the protective case 15 and the through hole 16 is not limited thereto. As illustrated in FIG. 6, the inner diameter of the side wall of the protective case 15' may be formed to be the same as the inner diameter d1 of the through hole 16.

FIG. 6 is a cross-sectional view illustrating a modification of the carbon fiber charging device of FIG. 3 according to an embodiment of the disclosure.

In FIG. 6, the protective case 15' may include an inclined surface 17 formed at one end of the circular pipe as an electron generation stabilization device. In this case, the inner diameter d1 of the circular pipe 15', that is, the inner diameter d1 of the inclined surface 17 may be 6 mm or less. The carbon fiber electrode 10 supported by the support member 18 is disposed inside the circular pipe 15'.

Figure 7:
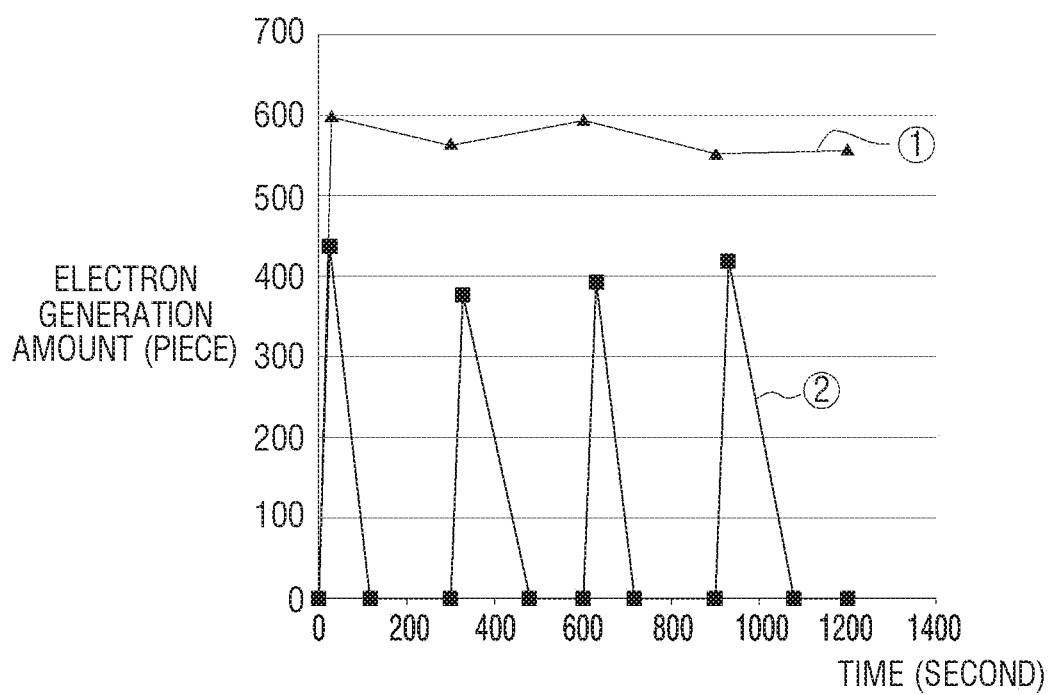
FIG. 7 is a graph illustrating a change in electron generation amount with time of the carbon fiber charging device of FIG. 3 according to an embodiment of the disclosure.

The result of comparing the amount of electron generation with time of the carbon fiber charging device 1' having the electron generation stabilization device formed as the inclined surface 17 as described above and the amount of electron generation with time of the carbon fiber charging device having only through hole of circular cross-section without an electron generation stabilization device is shown in FIG. 7.

FIG. 7 is a graph illustrating a change in electron generation amount with time of the carbon fiber charging device of FIG. 3 according to an embodiment of the disclosure.

Referring to FIG. 7, the line ① is a graph showing the amount of electron generation of the carbon fiber charging device 1 according to an embodiment of the disclosure including the electron generation stabilization device 17, and the line ② is a graph showing the amount of electron generation of the carbon fiber charging device having only a through hole of circular cross-section without the electron generation stabilization device.

Referring to the line ① of FIG. 7, in the carbon fiber charging device 1 according to an embodiment of the disclosure having the electron generation stabilization device, when a high voltage is applied, the amount of electron generation increases with the passage of time to reach a maximum of about 600, and then the amount of electron generation is kept stable in the range of 550 to 600 over time.

However, referring to the line ② of FIG. 7, in the carbon fiber charging device having only a through hole of circular cross-section without the electron generation stabilization device, when a high voltage is applied, the amount of electron generation increases with the passage of time to reach a maximum of about 450, and as time passes, the amount of electron generation decreases to zero. Thereafter, when a certain time elapses again, electrons are generated again, and then decreases to zero. In other words, in the carbon fiber charging device without the electron generation stabilization device, electrons are not generated stably in the carbon fiber electrode but are intermittently generated.

In the above description, the inclined surface 17 is formed in the through hole 16 of the top wall 15*a* of the protective case 15 as the electron generation stabilization device 17. However, as another example, the case where a ventilation path is formed in protective case as the electron generation stabilization device will be described in detail with reference to FIGS. 8 to 13.

Figure 8:
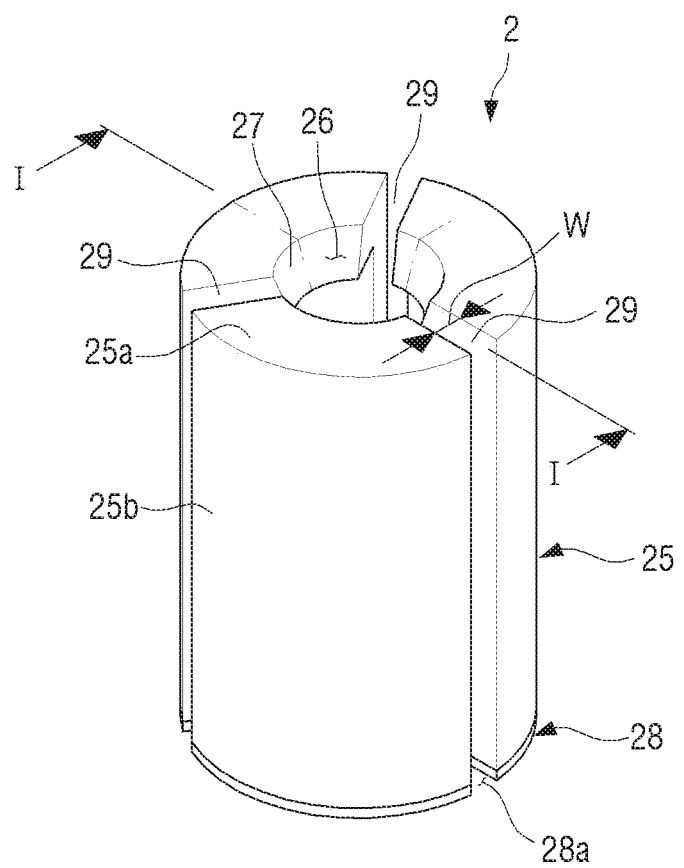
FIG. 8 is a perspective view illustrating a carbon fiber charging device according to another embodiment of the disclosure.
Figure 9:
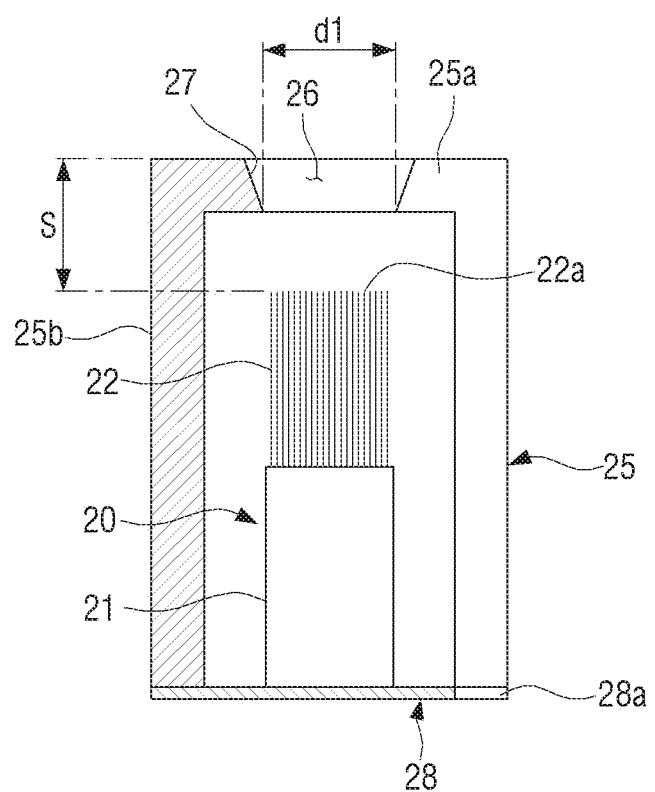
FIG. 9 is a cross-sectional view illustrating the carbon fiber charging device of FIG. 8 according to an embodiment of the disclosure.

FIG. 8 is a perspective view illustrating a carbon fiber charging device according to another embodiment of the disclosure, and FIG. 9 is a cross-sectional view illustrating the carbon fiber charging device of FIG. 8 according to an embodiment of the disclosure.

Referring to FIGS. 8 and 9, a carbon fiber charging device 2 according to an embodiment of the disclosure may include a carbon fiber electrode 20, a protective case 25, and an electron generation stabilization device 29.

The carbon fiber electrode 20 may include a plurality of carbon fibers 22 and a fixed rod 21. The carbon fiber electrode 20 is the same as the carbon fiber electrode 10 of the carbon fiber charging device 1 according to the above-described embodiment; therefore, a detailed description thereof is omitted.

The protective case 25 is formed to cover the carbon fiber electrode 20 described above. For example, the protective case 25 may a top wall 25*a* facing the tip 22*a* of the carbon fiber electrode 20 and provided with a through hole 26 and a side wall 25*b* surrounding the outer circumferential surface of the carbon fiber electrode 20. In other words, the protective case 25 may be formed in a hollow cylindrical shape whose one end is open. Therefore, the carbon fiber electrode 20 is disposed in the inner space of the protective case 25.

The top wall 25*a* of the protective case 25 is configured to function as a shield plate that prevents a person's hand or finger from contacting the carbon fiber electrode 20 to which a high voltage is applied, and includes the through hole 26 through which electrons generated from the carbon fiber electrode 20 may be emitted. The through hole 26 may have a diameter d1 of 6 mm or less so as to prevent the user's finger from being inserted into the through hole 26. In addition, the inner side surface of the through hole 26 may be formed in an inclined surface 27 that diverges outward as illustrated in FIG. 4. As another example, although not illustrated, the through hole 26 may be formed in a cylindrical shape with the same upper and lower diameters.

In addition, the inner surface of the top wall 25a of the protective case 25 is formed so as not to contact the tip 22a of the carbon fiber electrode 20. In order to prevent electric shock of the user, the distance S between the outer surface of the top wall 25a of the protective case 25 and the tip 22a of the carbon fiber electrode 20 may be at least 2 mm.

A support member 28 to which the carbon fiber electrode 20 is fixed may be provided at the lower end of the protective case 25.

The electron generation stabilization device 29 is to allow the carbon fiber electrode 20 to stably generate electrons, and may be implemented with a ventilation path formed in the protective case 25 to communicate with the through hole 26 of the top wall 25a so that outside air flows.

In the embodiment as illustrated in FIGS. 8 and 9, the electron generation stabilization device 29 is implemented with three slots formed in the protective case 25 in the longitudinal direction. In other words, the three slots 29 provided in the protective case 25 form the ventilation path communicating with the through hole 26. At this time, the width W of the slot 29 may be about 6 mm or less so that the user's finger cannot enter. The support member 28 is provided with three openings 28a corresponding to the three slots 29 of the protective case 25. Therefore, air below the carbon fiber charging device 2 may flow to the through hole 26 through the openings 28a of the support member 28 and the slots 29 of the protective case 25.

When the protective case 25 is provided with the ventilation path communicating with the through hole 26, an air passage through which air can flow is provided inside the protective case 25. Therefore, the flow of electron wind generated when electrons are emitted from the carbon fiber electrode 20 may be emitted to the outside through the through hole 26 without being blocked. As a result, the space potential around the carbon fiber electrode 20 may be kept low. Therefore, electrons may be stably generated in the carbon fiber electrode 20.

In FIG. 8, three slots 29 are formed in the protective case 25 as the electron generation stabilization device, but the number of slots 29 is not limited thereto. If desired, the slots 29 may be formed in two or four or more.

Hereinafter, another example of the ventilation path formed in the carbon fiber charging device will be described with reference to FIGS. 10 to 12.

Figure 10:
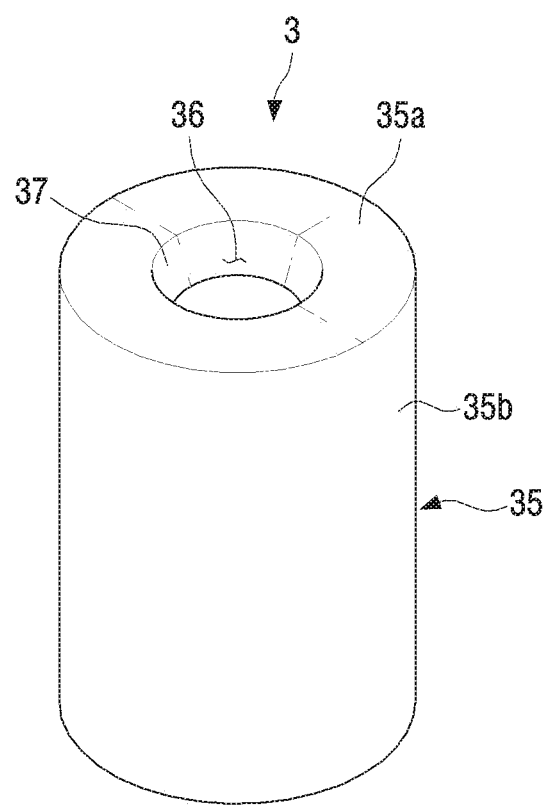
FIG. 10 is a perspective view illustrating a carbon fiber charging device according to another embodiment of the disclosure.

FIG. 10 is a perspective view illustrating a carbon fiber charging device according to another embodiment of the disclosure.

Figure 11:
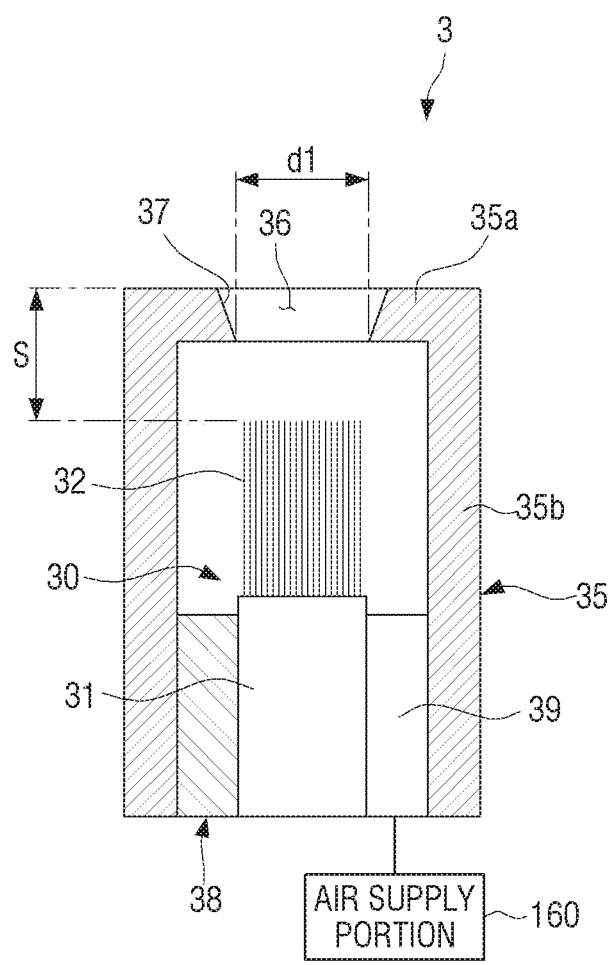
FIG. 11 is a cross-sectional view illustrating the carbon fiber charging device of FIG. 10 according to an embodiment of the disclosure.
Figure 12:
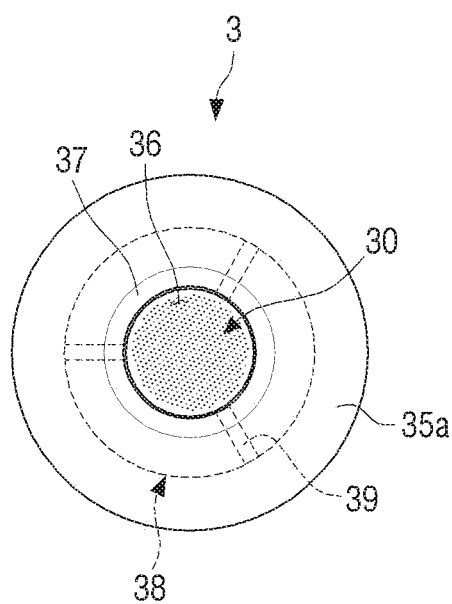
FIG. 12 is a plan view illustrating the carbon fiber charging device of FIG. 10 according to an embodiment of the disclosure.

FIG. 11 is a cross-sectional view illustrating the carbon fiber charging device of FIG. 10 according to an embodiment of the disclosure, and FIG. 12 is a plan view illustrating the carbon fiber charging device of FIG. 10 according to an embodiment of the disclosure.

Referring to FIGS. 10 to 12, a carbon fiber charging device 3 according to an embodiment of the disclosure may include a carbon fiber electrode 30, a protective case 35, and an electron generation stabilization device 39.

The carbon fiber electrode 30 may include a plurality of carbon fibers 32 and a fixed rod 31. The carbon fiber electrode 30 is the same as the carbon fiber electrode 10 of the carbon fiber charging device 1 according to the above-described embodiment; therefore, a detailed description thereof is omitted.

The protective case 35 is formed to cover the carbon fiber electrode 30 described above. For example, the protective case 35 may include a top wall 35a facing the tip of the carbon fiber electrode 30 and provided with a through hole 36 and a side wall 35b surrounding the outer circumferential surface of the carbon fiber electrode 30. In other words, the protective case 35 may be formed in a cylindrical shape whose one end is open. Therefore, the carbon fiber electrode 30 is disposed in the inner space of the protective case 35.

The top wall 35a of the protective case 35 is configured to function as a shield plate that prevents a person's hand or finger from contacting the carbon fiber electrode 30 to which a high voltage is applied, and includes the through hole 36 through which electrons generated from the carbon fiber electrode 30 may be emitted. The through hole 36 may have a diameter d1 of 6 mm or less so as to prevent the user's finger from being inserted into the through hole 36. In addition, the inner side surface of the through hole 36 may be formed in an inclined surface 37 that diverges outward as illustrated in FIGS. 10 and 11. As another example, although not illustrated, the through hole 36 may be formed in a cylindrical shape with the same upper and lower diameters.

In addition, the inner surface of the top wall 35a of the protective case 35 is formed so as not to contact the tip of the carbon fiber electrode 30. In order to prevent electric shock of the user, the distance S between the outer surface of the top wall 35a of the protective case 35 and the tip of the carbon fiber electrode 30 may be at least 2 mm.

A support member 38 to which the carbon fiber electrode 30 is fixed may be provided at the lower end of the protective case 35. The support member 38 may be formed as a fixing ring for fixing the fixed rod 31 of the carbon fiber electrode 30 to the inner side surface of the protective case 35. In detail, the fixing ring 38 may be provided between the carbon fiber electrode 30 and the protective case 35. The plurality of carbon fibers 32 are provided on the top end of the fixed rod 31.

The electron generation stabilization device 39 may be formed as a plurality of slots 39 formed to penetrate the fixing ring 38 in the longitudinal direction of the protective case 35. In the embodiment as illustrated in FIGS. 11 and 12, the electron generation stabilization device 39 is implemented with three slots 39 formed in the fixing ring 38. The three slots 39 provided in the fixing ring 38 communicate the lower end of the protective case 35 with the through hole 36 of the top wall 35a, thereby forming a ventilation path through which outside air flows.

As such, when the fixing ring 38 is provided with the ventilation path communicating with the through hole 36, an air passage through which air can flow is provided inside the protective case 35. Therefore, the flow of electron wind generated when electrons are emitted from the carbon fiber electrode 30 may be emitted to the outside through the through hole 36 without being blocked. As a result, the space potential around the carbon fiber electrode 30 may be kept low. Therefore, electrons may be stably generated in the carbon fiber electrode 30.

In FIG. 12, three slots 39 are formed in the fixing ring 38 as the electron generation stabilization device, but the number of slots 39 is not limited thereto. If desired, the slots 39 may be formed in two or four or more. In addition, in FIG. 12, the plurality of slots 39 are formed in the fixing ring 38 as the electron generation stabilization device; however, the electron generation stabilization device is not limited to the plurality of slots 39. Although not illustrated, the electron generation stabilization device may be formed as a plurality of holes penetrating the fixing ring 38 in the longitudinal direction instead of the slots in the fixing ring 38.

In addition, as another example, as illustrated in FIG. 11, an air supply portion 160 may be connected to the plurality of slots 39 of the fixing ring 38. The air supply portion 160 is configured to forcibly supply air. Accordingly, when the air supply portion 160 is connected to the plurality of slots 39 of the fixing ring 38, air is forcibly supplied to the carbon fiber electrode 30 through the plurality of slots 39, that is, the ventilation path. As a result, electrons generated from the carbon fiber electrode 30 may be emitted to the outside of the protective case 35 more smoothly. The air supply portion 160 may be configured by using a separate fan. Alternatively, the air supply portion 160 may be formed of a pipe to allow air discharged to the outside by the air moving device 130 of the electrical appliance 100 to be introduced into the plurality of slots 39 of the fixing ring 38.

Figure 13:
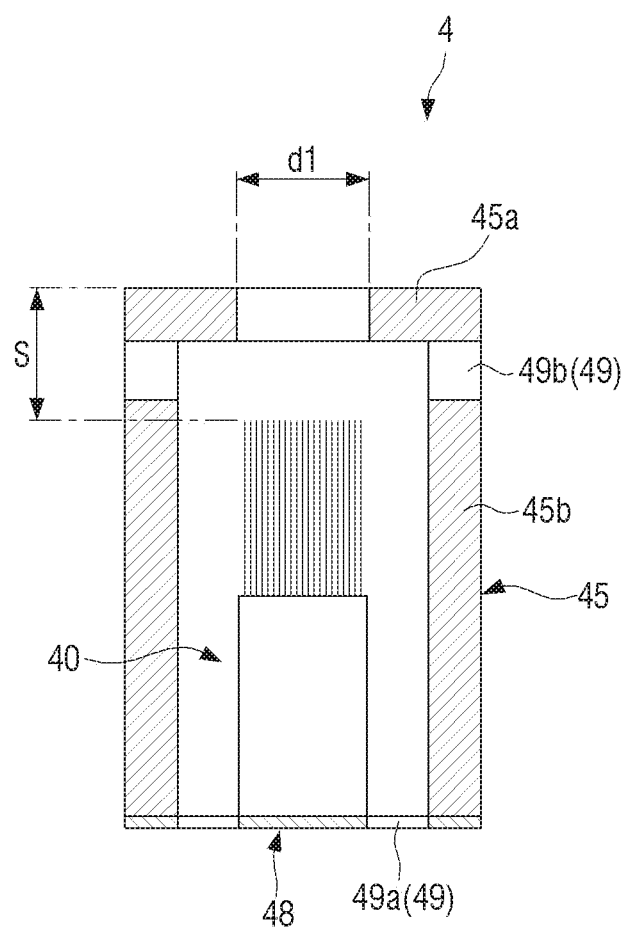
FIG. 13 is a cross-sectional view illustrating a carbon fiber charging device according to another embodiment of the disclosure.

FIG. 13 is a cross-sectional view illustrating a carbon fiber charging device according to another embodiment of the disclosure.

Referring to FIG. 13, a carbon fiber charging device 4 according to an embodiment of the disclosure may include a carbon fiber electrode 40, a protective case 45, and an electron generation stabilization device 49.

The carbon fiber electrode 40 is the same as the carbon fiber electrode 10 of the carbon fiber charging device 1 according to the above-described embodiment; therefore, a detailed description thereof is omitted.

The protective case 45 is formed to cover the carbon fiber electrode 40 described above. For example, the protective case 45 may include a top wall 45a facing the tip of the carbon fiber electrode 40 and provided with a through hole 46 and a side wall 45b surrounding the outer circumferential surface of the carbon fiber electrode 40. In other words, the protective case 45 may be formed in a cylindrical shape whose one end is open. Therefore, the carbon fiber electrode 40 is disposed in the inner space of the protective case 45.

The top wall 45a of the protective case 45 is configured to function as a shield plate that prevents a person's hand or finger from contacting the carbon fiber electrode 40 to which a high voltage is applied, and includes the through hole 46 through which electrons generated from the carbon fiber electrode 40 may be emitted. The through hole 46 may have a diameter d1 of 6 mm or less so as to prevent the user's finger from being inserted into the through hole 46.

In addition, the inner surface of the top wall 45a of the protective case 45 is formed so as not to contact the tip of the carbon fiber electrode 40. In order to prevent electric shock of the user, the distance S between the outer surface of the top wall 45a of the protective case 45 and the tip of the carbon fiber electrode 40 may be at least 2 mm.

A support member 48 for supporting and fixing the carbon fiber electrode 40 may be provided at the lower end of the protective case 45.

The electron generation stabilization device 49 may be implemented as a ventilation path configured to allow air around the protective case 45 to flow toward the through hole 46. For example, the ventilation path 49 may include at least one opening 49a formed in the support member 48 fixed to the lower end of the protective case 45 and at least one side opening 49b formed in the side wall 45b of the protective case 45. In the embodiment as illustrated in FIG. 13, two openings 49a are provided in the support member 48, and two side openings 49b are provided in the side wall 45b of the protective case 45. However, the number of the openings 49a of the support member 48 and the number of the side openings 49b of the protective case 45 are not limited thereto. If necessary, three or more openings 49a of the support member 48 and three or more side openings 49b of the protective case 45 may be formed.

As such, when the ventilation path 49 is formed in the side wall 45b of the protective case 45 and the support member 48 to communicate with the through hole 46, an air passage through which air can flow from the bottom of the carbon fiber electrode 40 to the top thereof is provided inside the protective case 45. Therefore, the flow of electron wind generated when electrons are emitted from the tip of the carbon fiber electrode 40 may be emitted to the outside through the through hole 46 without being blocked. As a result, the space potential around the carbon fiber electrode 40 may be kept low. Therefore, electrons may be stably generated in the carbon fiber electrode 40.

Hereinafter, another example of the electron generation stabilization device used in the carbon fiber charging device will be described with reference to FIGS. 14 to 17.

Figure 14:
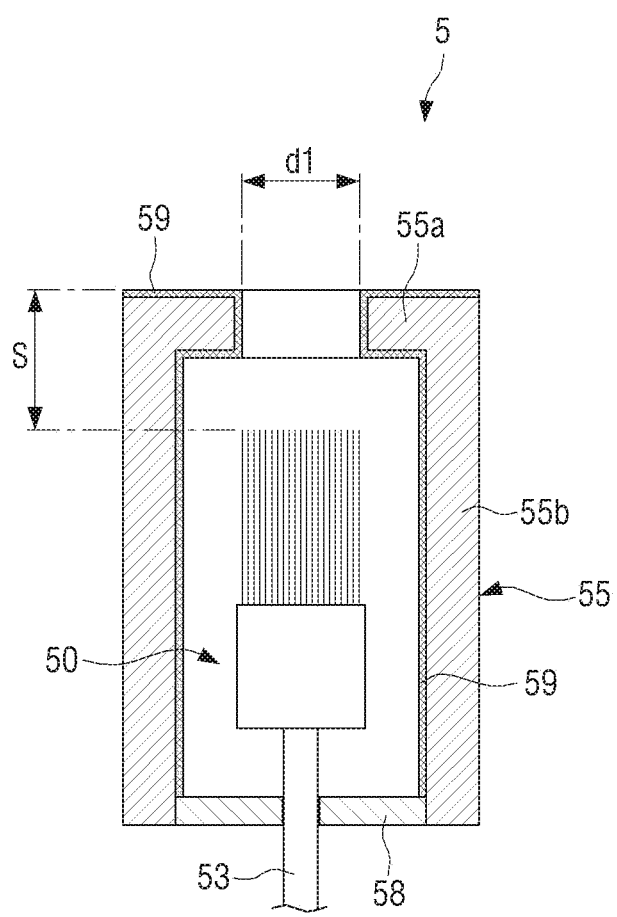
FIG. 14 is a cross-sectional view illustrating a carbon fiber charging device according to another embodiment of the disclosure.

FIG. 14 is a cross-sectional view illustrating a carbon fiber charging device according to another embodiment of the disclosure.

Referring to FIG. 14, a carbon fiber charging device 5 according to an embodiment of the disclosure may include a carbon fiber electrode 50, a protective case 55, and an electron generation stabilization device 59.

The carbon fiber electrode 50 is the same as the carbon fiber electrode 10 of the carbon fiber charging device 1 according to the above-described embodiment; therefore, a detailed description thereof is omitted.

The protective case 55 is formed to cover the carbon fiber electrode 50 described above. For example, the protective case 55 may include a top wall 55a facing the tip of the carbon fiber electrode 50 and provided with a through hole 56 and a side wall 55b surrounding the outer circumferential surface of the carbon fiber electrode 50. In other words, the protective case 55 may be formed in a cylindrical shape whose one end is open. Therefore, the carbon fiber electrode 50 is disposed in the inner space of the protective case 55.

The top wall 55a of the protective case 55 is configured to function as a shield plate that prevents a person's hand or finger from contacting the carbon fiber electrode 50 to which a high voltage is applied, and includes the through hole 56 through which electrons generated from the tip of the carbon fiber electrode 40 may be emitted. The through hole 46 may have a diameter d1 of 6 mm or less so as to prevent the user's finger from being inserted into the through hole 56. The through hole 56 may be formed in a cylindrical shape with the same upper and lower diameters.

In addition, the inner surface of the top wall 55a of the protective case 55 is formed so as not to contact the tip of the carbon fiber electrode 50. In order to prevent electric shock of the user, the distance S between the outer surface of the top wall 55a of the protective case 55 and the tip of the carbon fiber electrode 50 may be at least 2 mm.

A fixing member 58 may be provided at the lower end of the protective case 55 to fix a wire 53 connected to the carbon fiber electrode 50. For example, the lower end of the carbon fiber electrode 50 is connected to the wire 53 for applying a high voltage, and the wire 53 is fixed to the lower end of the protective case 55 by the fixing member 58. Accordingly, the carbon fiber electrode 50 is disposed inside the protective case 55 by the wire 53 and the fixing member 58. In addition, the wire 53 is connected to the high voltage applying part 150 (see FIG. 2) to apply a high voltage to the carbon fiber electrode 50.

The electron generation stabilization device 59 is to allow the carbon fiber electrode 50 to stably generate electrons. In this embodiment, the electron generation stabilization device 59 may be implemented with a charge prevention coating layer or film. The charge prevention coating layer or film 59 may be formed on the inner surface of the top wall 55a of the protective case 55 and the inner side surface of the through hole 56. In addition, the charge prevention coating layer or film 59 may be formed on the outer surface of the top wall 55a of the protective case 55 and the inner surface of the side wall 55b of the protective case 55.

The charge prevention coating layer or film 59 may have a surface resistance of about 105 to 1011 Ω/sq., so that charges are prevented from be accumulated on the surface of the protective case 55 and are always diffused. When the surface resistance of the charge prevention coating layer or film 59 is smaller than this range, the surface of the protective case 55 may be a discharge path. In addition, when the surface resistance of the charge prevention coating layer or film 59 is larger than this range, the effect of removing charges by diffusion of charges may be reduced.

Figure 15:
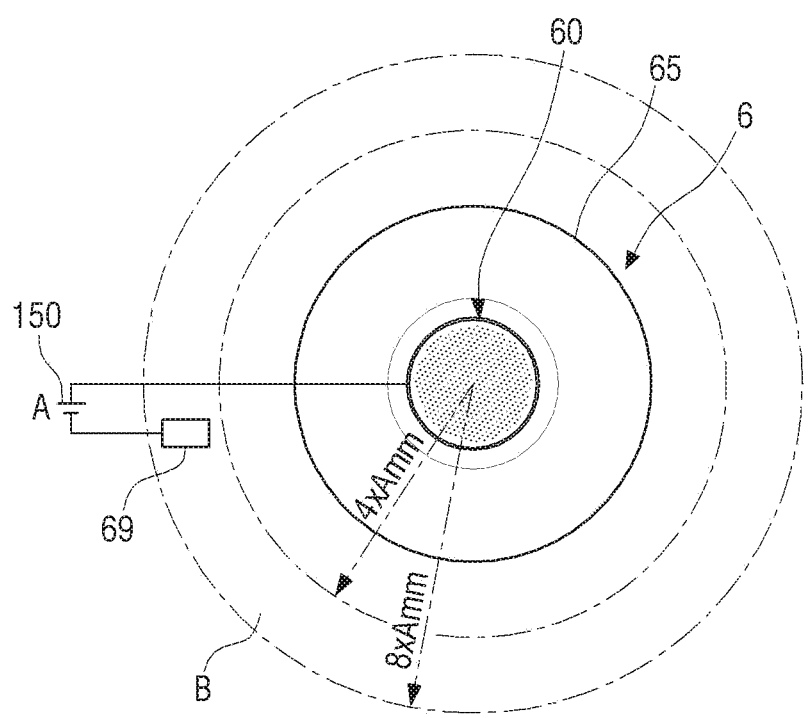
FIG. 15 is a view illustrating a carbon fiber charging device according to another embodiment of the disclosure.

FIG. 15 is a view illustrating a carbon fiber charging device according to another embodiment of the disclosure.

Referring to FIG. 15, a carbon fiber charging device 6 according to an embodiment of the disclosure may include a carbon fiber electrode 60, a protective case 65, and an electron generation stabilization device 69.

The carbon fiber electrode 60 is the same as the carbon fiber electrode 50 of the carbon fiber charging device 5 according to the above-described embodiment; therefore, a detailed description thereof is omitted.

The protective case 65 is the same as the protective case 55 of the carbon fiber charging device 5 as illustrated in FIG. 14 except that the charge prevention coating layer or film 59 is not formed on the surface. Therefore, detailed description thereof is omitted.

The electron generation stabilization device 69 is to allow the carbon fiber electrode 60 to stably generate electrons. In this embodiment, the electron generation stabilization device 69 may be implemented as a ground electrode 69 disposed near the carbon fiber electrode 60. The carbon fiber electrode 60 is connected to the high voltage applying part 150, and the ground electrode 69 is connected to the ground of the high voltage applying part 150.

When the ground electrode 69 is positioned too close to the carbon fiber electrode 60, most of the electrons may be absorbed by the ground electrode 69, or the insulation of air may be broken and spark discharge may occur. On the other hand, when the ground electrode 69 is disposed too far from the carbon fiber electrode 60, the potential gradient formed around the carbon fiber electrode 60 is weakened, so that electrons may not be stably generated in the carbon fiber electrode 60.

Therefore, the ground electrode 69 may be disposed within a range of 4 times or more to 8 times or less of the voltage A applied to the carbon fiber electrode 60 as illustrated in FIG. 15. For example, when a voltage of 7 kV is applied to the carbon fiber electrode 50, the ground electrode 69 may be disposed in the ring region B having a radius of 4×7=28 mm and a radius of 8×7=56 mm around the carbon fiber electrode 60.

In this way, when the ground electrode 69 is provided within a predetermined range near the carbon fiber electrode 60, some of the electrons generated from the carbon fiber electrode 60 and diffused to the surroundings are absorbed by the ground electrode 69, thereby lowering the space potential. Thus, a small potential gradient is stably formed around the carbon fiber electrode 60. By this potential gradient, electrons are stably generated in the carbon fiber electrode 50, and some of the electrons are slowly absorbed by the ground electrode 69, and many of the other electrons overcome the potential gradient, diffuse and are emitted to the surroundings.

Figure 16:
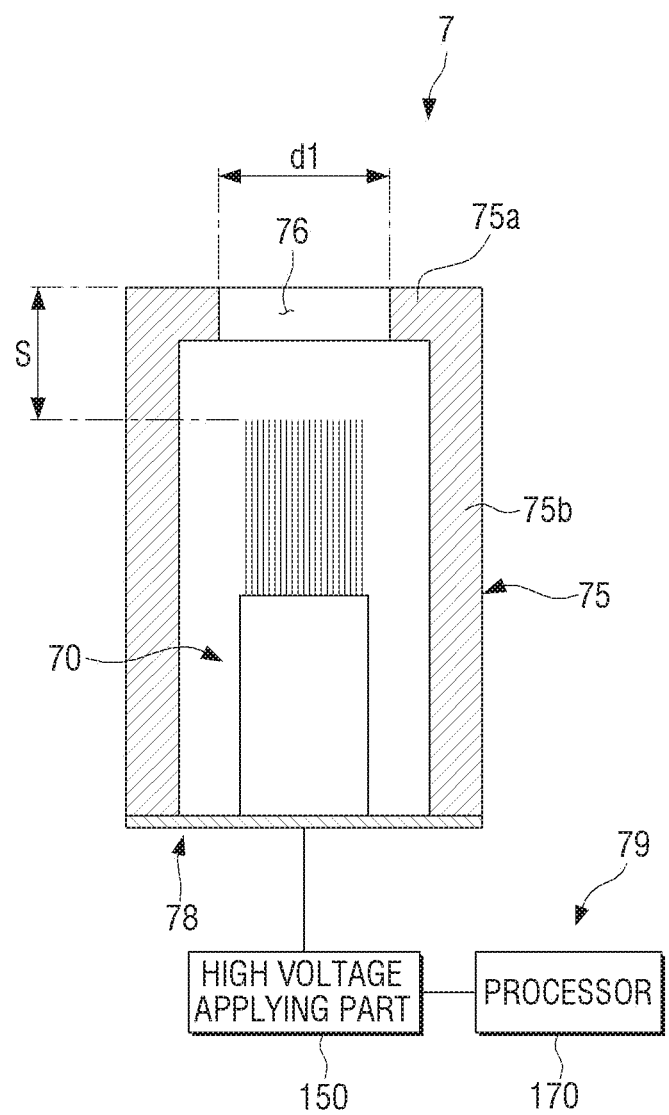
FIG. 16 is a cross-sectional view illustrating a carbon fiber charging device according to another embodiment of the disclosure.

FIG. 16 is a cross-sectional view illustrating a carbon fiber charging device according to another embodiment of the disclosure.

Referring to FIG. 16, a carbon fiber charging device 7 according to an embodiment of the disclosure may include a carbon fiber electrode 70, a protective case 75, and an electron generation stabilization device 79.

The carbon fiber electrode 70 is the same as the carbon fiber electrode 10 of the carbon fiber charging device 1 according to the above-described embodiment; therefore, a detailed description thereof is omitted.

The protective case 75 is formed to cover the carbon fiber electrode 70 described above. For example, the protective case 75 may include a top wall 75a facing the tip of the carbon fiber electrode 70 and provided with a through hole 76 and a side wall 75b surrounding the outer circumferential surface of the carbon fiber electrode 70. In other words, the protective case 75 may be formed in a cylindrical shape whose one end is open. Therefore, the carbon fiber electrode 70 is disposed in the inner space of the protective case 75.

The top wall 75a of the protective case 75 is configured to function as a shield plate that prevents a person's hand or finger from contacting the carbon fiber electrode 70 to which a high voltage is applied, and includes the through hole 76 through which electrons generated from the carbon fiber electrode 70 may be emitted. The through hole 76 may have a diameter d1 of 6 mm or less so as to prevent the user's finger from being inserted into the through hole 76.

In addition, the inner surface of the top wall 75a of the protective case 75 is formed so as not to contact the tip of the carbon fiber electrode 70. In order to prevent electric shock of the user, the distance S between the outer surface of the top wall 75a of the protective case 75 and the tip of the carbon fiber electrode 70 may be at least 2 mm.

A support member 78 for supporting and fixing the carbon fiber electrode 70 may be provided at the lower end of the protective case 75. The carbon fiber electrode 70 may be electrically connected to the high voltage applying part 150 configured to apply a high voltage. To this end, the support member 38 may be provided with a power line (not illustrated) for electrically connecting the carbon fiber electrode 70 and the high voltage applying part 150.

The electron generation stabilization device 79 may be implemented as the high voltage applying part 150 configured to apply a high voltage to the carbon fiber electrode 70 and a processor 170 configured to control the high voltage applying part 150. The processor 170 may be configured to control the high voltage applying part 150 such that the high voltage applying part 150 applies a high voltage to the carbon fiber electrode 70 and blocks the high voltage from being applied to the carbon fiber electrode 70 at a predetermined time interval. The processor 170 may be configured as a part of a main processor that controls the operation of the electrical appliance 100.

As described above, when the processor 170 controls the on/off of the high voltage applying part 150 for applying a high voltage to the carbon fiber electrode 70, electrons emitted from the carbon fiber electrode 70 and charged on the top wall 75a of the protective case 75 are absorbed by the carbon fiber electrode 70 to recover the potential gradient around the carbon fiber electrode 70.

Figure 17:
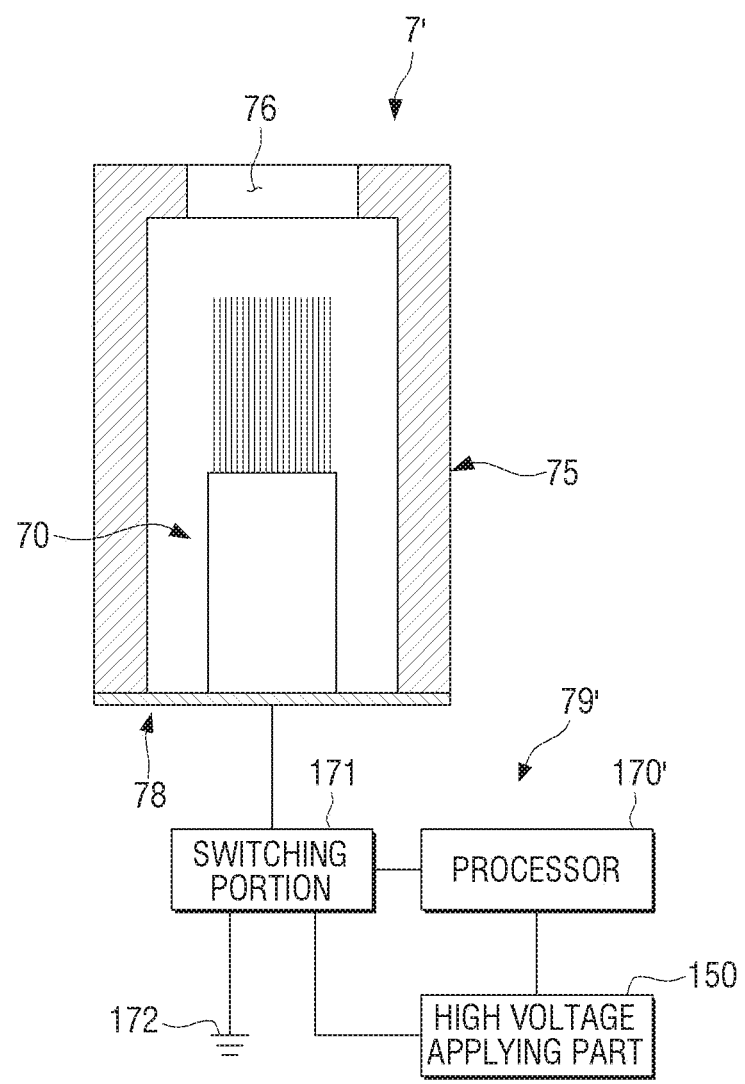
FIG. 17 is a cross-sectional view illustrating a carbon fiber charging device according to another embodiment of the disclosure.

FIG. 17 is a cross-sectional view illustrating a carbon fiber charging device according to another embodiment of the disclosure.

Referring to FIG. 17, a carbon fiber charging device 7' according to an embodiment of the disclosure may include a carbon fiber electrode 70, a protective case 75, and an electron generation stabilization device 79'.

The carbon fiber electrode 70 and the protective case 75 are the same as the carbon fiber electrode 70 and the protective case 75 of the carbon fiber charging device 7 according to the embodiment shown in FIG. 16; therefore, detailed descriptions thereof are omitted.

A support member 78 for supporting and fixing the carbon fiber electrode 70 may be provided at the lower end of the protective case 75.

The electron generation stabilization device 79' may include a switching portion 171 electrically connected to the carbon fiber electrode 70 through the support member 78, a high voltage applying part 150 and a ground 172 electrically connected to the switching portion 171, and a processor 170' configured to control the switching portion 171.

The switching portion 171 is configured to selectively connect one of the high voltage applying part 150 and the ground 172 to the carbon fiber electrode 70.

The high voltage applying part 150 is configured to apply a high voltage to the carbon fiber electrode 70. When the high voltage applying part 150 is electrically connected to the carbon fiber electrode 70 by the switching portion 171, a high voltage is applied to the carbon fiber electrode 70.

The processor 170' is electrically connected to the switching portion 171 and the high voltage applying part 150 to control the switching portion 171 and the high voltage applying part 150. Accordingly, the processor 170' controls the switching portion 171 to electrically connect the carbon fiber electrode 70 to any one of the high voltage applying part 150 and the ground 172.

For example, the processor 170' may control the switching portion 171 to connect the carbon fiber electrode 70 to the high voltage applying part 150. Then, the high voltage of the high voltage applying part 150 is applied to the carbon fiber electrode 70. At this time, the carbon fiber electrode 70 is disconnected from the ground 172. On the other hand, the processor 170' may control the switching portion 171 to connect the carbon fiber electrode 70 to the ground 172. At this time, the carbon fiber electrode 70 is disconnected from the high voltage applying part 150. Thus, the carbon fiber electrode 70 is electrically connected to the ground 172 so that charges around the carbon fiber electrode 70 flow through the carbon fiber electrode 70 to the ground 172.

The processor 170' may control the switching portion 171 in a predetermined pattern so that electrons are stably generated from the carbon fiber electrode 70. For example, the processor 170' may control the switching portion 171 so that the carbon fiber electrode 70 is connected to the high voltage applying part 150, and then the carbon fiber electrode 70 is disconnected from the high voltage applying part 150 and connected to the ground 172 at a predetermined time interval.

In detail, the processor 170' controls the switching portion 171 so that the carbon fiber electrode 70 is connected to the high voltage applying part 150 for a predetermined time, for example, about 20 minutes, and then the carbon fiber electrode 70 is disconnected from the high voltage applying part 150 and connected to the ground 172. Subsequently, the processor 170' controls the switching portion 171 so that the carbon fiber electrode 70 is connected to the ground 172 for a predetermined time, for example, about 5 seconds, and then the carbon fiber electrode 70 is disconnected from the ground 172 and connected to the high voltage applying part 150 again. When the carbon fiber electrode 70 is connected to the ground 172, electrons emitted from the carbon fiber electrode 70 and charged to the top wall 15a of the protective case 75 are absorbed by the carbon fiber electrode 70 and flows to the ground 172, so that the potential gradient around the carbon fiber electrode 70 is restored.

As such, when the processor 170' controls the switching portion 171 such that a high voltage time for which a high voltage is applied to the carbon fiber electrode 70 and a ground time for which the high voltage applied to the carbon fiber electrode 70 is cut off and the carbon fiber electrode 70 is connected to the ground 172 are alternately repeated at a predetermined duty ratio, the carbon fiber electrode 70 may stably generate electrons.

Figure 18:
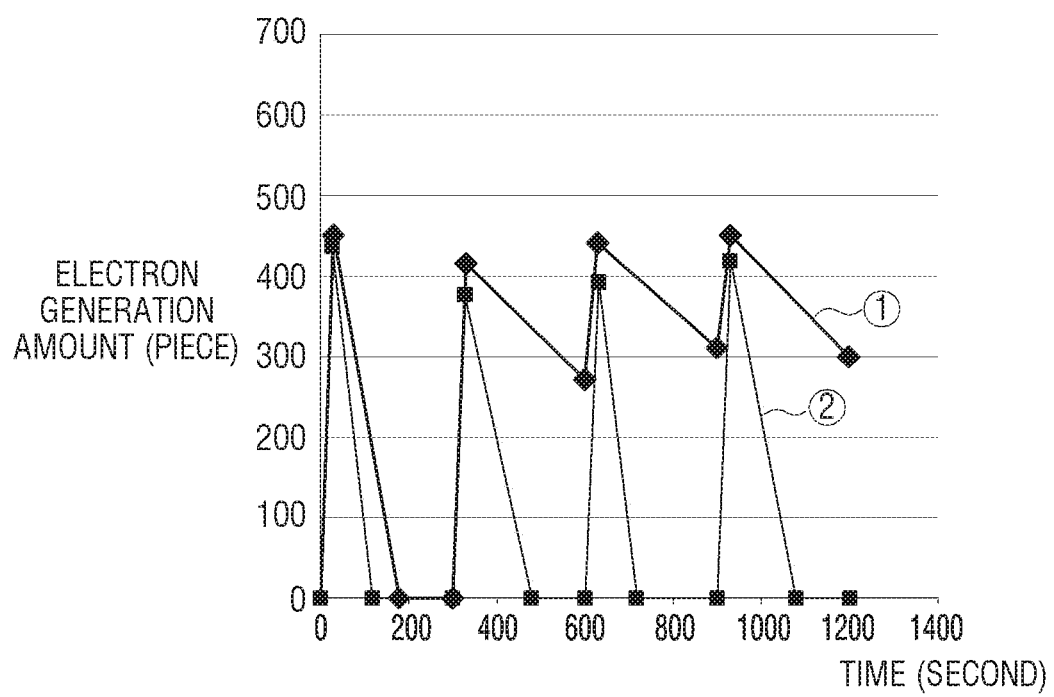
FIG. 18 is a graph illustrating a change in electron generation amount with time of the carbon fiber charging device of FIG. 17 according to an embodiment of the disclosure.

The result of comparing the amount of electron generation with time of the carbon fiber charging device 7' according to an embodiment of the disclosure having the electron generation stabilization device 79' including the above-described switching portion 171 and the amount of electron generation with time of the carbon fiber charging device having only through hole of circular cross-section without the electron generation stabilization device is shown in FIG. 18.

FIG. 18 is a graph illustrating a change in electron generation amount with time of the carbon fiber charging device of FIG. 17 according to an embodiment of the disclosure.

Referring to FIG. 18, the line D is a graph showing the amount of electron generation of the carbon fiber charging device according to an embodiment of the disclosure including the electron generation stabilization device, and the line 2 is a graph showing the amount of electron generation of the carbon fiber charging device having only a through hole of circular cross-section without the electron generation stabilization device.

Referring to the line ① of FIG. 18, in the carbon fiber charging device according to an embodiment of the disclosure having the electron generation stabilization device, when a high voltage is applied, the amount of electron generation increases with the passage of time to reach a maximum of about 450, and then the amount of electron generation becomes zero with the passage of time. However, after the amount of electron generation becomes zero, when the control in which the carbon fiber electrode 70 is connected to the ground 172 for a predetermined time, for example, 3 seconds, and then to the high voltage applying part 150, and the connection is maintained for a predetermined time is repeated, the amount of electron generation is kept stable in the range of about 280 to 450.

However, referring to the line ② of FIG. 18, in the carbon fiber charging device having only a through hole of circular cross-section without the electron generation stabilization device, when a high voltage is applied, the amount of electron generation increases with the passage of time to reach a maximum of about 450, and as time passes, the amount of electron generation decreases to zero. Thereafter, when a certain time elapses again, electrons are generated again and decreases to zero. In other words, in the carbon fiber charging device without the electron generation stabilization device according to an embodiment of the disclosure, electrons are not generated stably from the carbon fiber electrode but are intermittently generated.

With the carbon fiber charging device according to an embodiment of the disclosure having the structure as described above, it is possible to prevent a person from being subjected to electric shock by contacting the carbon fiber electrode, and to stably generate electrons to charge contaminants.

Hereinafter, a case in which a carbon fiber charging device according to an embodiment of the disclosure is applied to an indoor unit for an air conditioner will be described in detail with reference to FIGS. 19 and 20.

Figure 19:
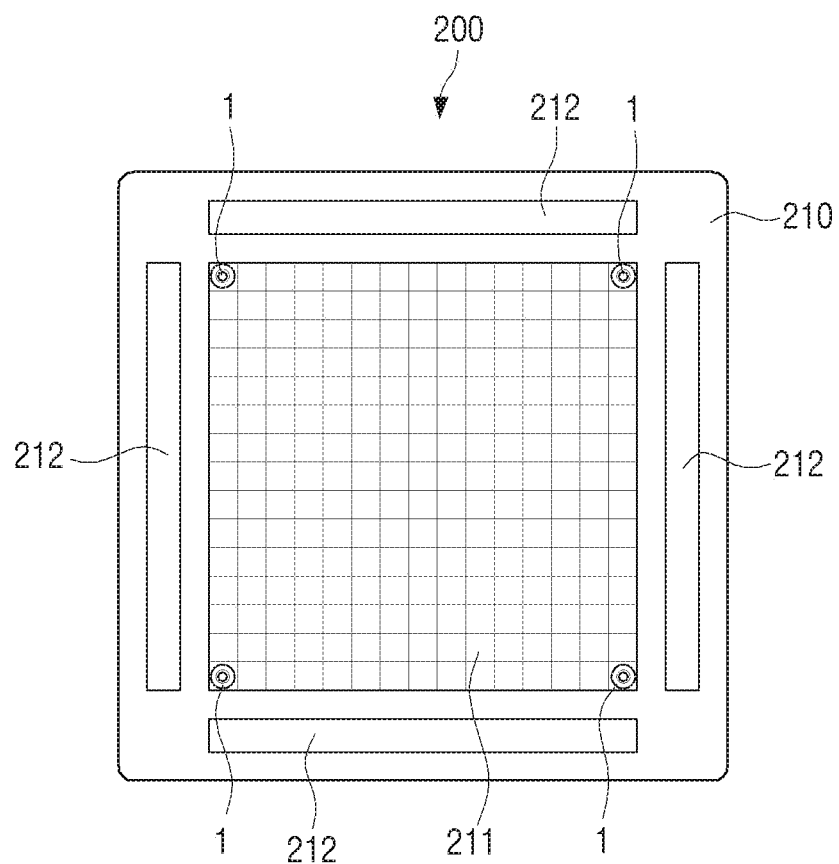
FIG. 19 is a bottom view illustrating an indoor unit of a ceiling type air conditioner with a carbon fiber charging device according to an embodiment of the disclosure.
Figure 20:
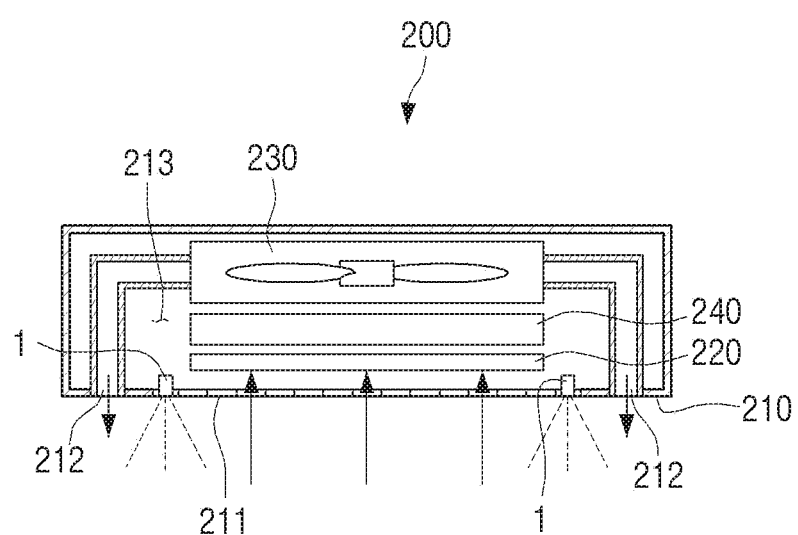
FIG. 20 is a cross-sectional view illustrating the indoor unit of the ceiling type air conditioner of FIG. 19 according to an embodiment of the disclosure.

FIG. 19 is a bottom view illustrating an indoor unit of a ceiling type air conditioner with a carbon fiber charging device according to an embodiment of the disclosure, and FIG. 20 is a cross-sectional view illustrating the indoor unit of the ceiling type air conditioner of FIG. 19 according to an embodiment of the disclosure.

Referring to FIGS. 19 and 20, an indoor unit 200 of an air conditioner having a carbon fiber charging device according to an embodiment of the disclosure may include a cover 210, a carbon fiber charging device 1, a dust collecting device 220, a heat exchanger 240, and a blowing fan 230. For reference, FIGS. 19 and 20 illustrate the indoor unit 200 of the ceiling type air conditioner disposed in the ceiling of a room.

The cover 210 forms an outer appearance of the indoor unit 200 of the ceiling type air conditioner. The cover 210 includes an inlet 211 through which outside air is introduced and an outlet 212 through which air exchanged heat with the heat exchanger 240 is discharged. The inlet 211 is formed in a substantially square, and four outlets 212 are provided on four sides of the inlet 211, respectively. Inside the cover 210, an air passage 213 is formed to communicate the inlet 211 and the outlets 212. The sucked outside air passes through the air passage 213.

The carbon fiber charging device 1 is disposed at the edge of the inlet 211. In this embodiment, there are four carbon fiber charging devices 1 disposed at the four corners of the inlet 211. Each of the carbon fiber charging devices 1 is formed to charge contaminants such as dust contained in the air flowing into the inlet 211 by using electrons generated from the carbon fibers. The number and positions of the carbon fiber charging devices 1 may be appropriately defined so as to emit electrons with respect to the entire air flowing into the inlet 211.

The carbon fiber charging device 1 may include a carbon fiber electrode 10 configured to generate electrons, a protective case 15 configured to cover the carbon fiber electrode 10 and to prevent a user's finger from contacting the carbon fiber electrode 10, and an electron generation stabilization device 17 that enables the carbon fiber electrode 10 to stably generate electrons. The carbon fiber charging device 1 is the same as or similar to the carbon fiber charging device 1 as described above; therefore, a detailed description thereof is omitted.

The dust collecting device 220 is provided in the air passage 213 inside the cover 210 and is configured to collect contaminants charged by the carbon fiber charging device 1 from the air sucked by the blowing fan 230. The dust collecting device 220 may include, for example, a plurality of dust collecting plates spaced apart from each other by a predetermined distance and a dust collecting voltage applying part configured to apply a high voltage to the plurality of dust collecting plates. When a high voltage is applied to the plurality of dust collecting plates by the dust collecting voltage applying part, contaminants charged in combination with electrons generated by the carbon fiber charging device 1 may be collected on the plurality of dust collecting plates.

The heat exchanger 240 performs heat exchange with the air sucked by the blowing fan 230 to adjust the temperature of the air. For example, when the indoor unit 200 of the air conditioner cools the room, the heat exchanger 240 cools the air sucked by the blowing fan 230 to lower the temperature of the air. On the other hand, when the indoor unit 200 of the air conditioner heats the room, the heat exchanger 240 heats the air sucked by the blowing fan 230 to increase the temperature of the air. The heat exchanger 240 is the same as or similar to the heat exchanger used in the indoor unit of the air conditioner according to the prior art; therefore, a detailed description thereof is omitted.

The blowing fan 230 is disposed inside the cover 210, and is configured to allow outside air to be sucked into the inlet 211, passed through the heat exchanger 240, and then discharged to the outside of the cover 210 through the outlet 212. In other words, when the blowing fan 230 is operated, outside air containing contaminants is introduced into the inlet 211 of the cover 210. The introduced air passes through the dust collecting device 220 and the heat exchanger 240 along the air passage 213, and then is discharged through the outlet 212.

An operation of the indoor unit 200 of the ceiling type air conditioner having the above-described structure will be described with reference to FIGS. 19 and 20.

When the indoor unit 200 is operated, the high voltage applying part 150 (see FIG. 2) applies a high voltage to the plurality of carbon fiber charging devices 1 disposed at the edge of the inlet 211 of the cover 210 adjacent to the inlet 211. When a high voltage is applied to the plurality of carbon fiber charging devices 1, electrons are emitted from the carbon fiber electrodes 10 of the carbon fiber charging devices 1. Electrons emitted from the plurality of carbon fiber charging devices 1 combine with contaminants in the air flowing into the inlet 211 to charge the contaminants.

In addition, when the indoor unit 200 is operated, the blowing fan 230 is operated to introduce outside air into the cover 210 through the inlet 211. At this time, the contaminants in the outside air introduced into the inlet 211 are charged by the carbon fiber charging devices 1.

While the introduced outside air passes through the dust collecting device 220, the charged contaminants are collected by the dust collecting device 220 and the cleaned air moves to the heat exchanger 240.

The air cleaned by the dust collecting device 220 exchanges heat with refrigerant of the heat exchanger 240 while passing through the heat exchanger 240, so that the temperature of the air is adjusted.

The temperature-adjusted air passes through the blowing fan 230 and is discharged to the outside of the indoor unit 200 through the outlet 212 of the cover 210.

As described above, the indoor unit 200 of the air conditioner provided with the carbon fiber charging device according to an embodiment of the disclosure may remove contaminants from sucked air and adjust the temperature of the air.

In addition, in the carbon fiber charging device according to an embodiment of the disclosure, a carbon fiber electrode is provided with a protective case, a user's hand or finger may be prevented from contacting the carbon fiber electrode. Therefore, according to this disclosure, when the user cleans the indoor unit of the air conditioner, the user does not come into contact with the tip of the carbon fiber electrode and receive an electric shock.

Further, since the carbon fiber charging device according to an embodiment of the disclosure includes an electron generation stabilization device, it may stably generate electrons over time to charge surrounding contaminants.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A carbon fiber charging device comprising:
a carbon fiber electrode configured to generate electrons and charge surrounding dust;
a protective case configured to cover the carbon fiber electrode, the protective case including a top wall facing a tip of the carbon fiber electrode and provided with a through hole and a side wall surrounding an outer circumferential surface of the carbon fiber electrode; and
an electron generation stabilization apparatus provided in the protective case and configured to adjust a potential gradient around the carbon fiber electrode and allow the carbon fiber electrode to generate the electrons stably,
wherein the electron generation stabilization apparatus includes an inclined surface provided in an inner side surface of the through hole and inclined to diverge toward an outside of the protective case.

2. The carbon fiber charging device as claimed in claim 1, wherein the through hole of the protective case is formed in a circular cross-section, and
wherein a diameter of the through hole is 6 mm or less.

3. The carbon fiber charging device as claimed in claim 1, wherein the through hole of the protective case is formed in a polygonal cross-section, and
wherein a diameter of an inscribed circle of the through hole is 6 mm or less.

4. The carbon fiber charging device as claimed in claim 1, wherein a distance between an outer surface of the top wall of the protective case and the tip of the carbon fiber electrode is at least 2 mm.

5. The carbon fiber charging device as claimed in claim 1, wherein an inclination angle of the inclined surface of the through hole is in a range of 10 degrees to 15 degrees.

6. The carbon fiber charging device as claimed in claim 1, wherein the electron generation stabilization apparatus includes a ground electrode disposed in a vicinity of the carbon fiber electrode.

7. The carbon fiber charging device as claimed in claim 6, wherein the ground electrode is disposed in a ring area around the carbon fiber electrode having a radius of 4 times to 8 times a voltage applied to the carbon fiber electrode.

8. The carbon fiber charging device as claimed in claim 1, wherein the electron generation stabilization apparatus includes a charge prevention coating layer formed on the top wall of the protective case.

9. The carbon fiber charging device as claimed in claim 8, wherein a surface resistance of the charge prevention coating layer on the top wall of the protective case is in a range of $10^5$ to $10^{11}$ Ω/sq.

10. The carbon fiber charging device as claimed in claim 1, wherein the electron generation stabilization apparatus includes a ventilation path formed in the protective case in communication with the through hole of the top wall so that outside air flows through the ventilation path.

11. The carbon fiber charging device as claimed in claim 10, wherein the ventilation path includes an opening formed in a support member, on which the carbon fiber electrode is disposed, fixed to a lower end of the protective case and a side opening provided on the side wall of the protective case.

12. The carbon fiber charging device as claimed in claim 10, further comprising:
a fixing ring provided between the carbon fiber electrode and the protective case, the fixing ring configured to fix the carbon fiber electrode to the side wall of the protective case,
wherein the ventilation path is formed as a plurality of slots formed in a longitudinal direction of the protective case in the fixing ring.

13. The carbon fiber charging device as claimed in claim 1, wherein the electron generation stabilization apparatus includes an air supply apparatus configured to forcibly supply air to the carbon fiber electrode through a ventilation path.

14. The carbon fiber charging device as claimed in claim 1, wherein the electron generation stabilization apparatus comprises:
a high voltage applying part configured to apply a high voltage to the carbon fiber electrode; and
at least one processor configured to control the high voltage applying part to block the high voltage applied to the carbon fiber electrode at a predetermined time interval after the high voltage applying part applies the high voltage to the carbon fiber electrode.

15. The carbon fiber charging device as claimed in claim 1,
wherein the electron generation stabilization apparatus comprises:
a switching portion electrically connected to the carbon fiber electrode,
a high voltage applying part electrically connected to the switching portion and configured to apply a high voltage to the carbon fiber electrode,
a ground electrically connected to the switching portion, and
at least one processor connected to the switching portion and configured to control the switching portion so that the carbon fiber electrode is selectively connected to one of the high voltage applying part and the ground, and
wherein the at least one processor is configured to control the switching portion so that the carbon fiber electrode is connected to the high voltage applying part, and then a connection between the carbon fiber electrode and the high voltage applying part is blocked and the carbon fiber electrode is connected to the ground at a predetermined time interval.

16. An electrical appliance, comprising:
a main body including an inlet;
a carbon fiber charging device disposed on an edge of the inlet and configured to charge contaminants contained in air flowing into the inlet;
an air moving device provided inside the main body and configured to vacuum the air containing contaminants through the inlet and discharge the air to an outside of the main body; and
a dust collecting device disposed in an air passage through which air vacuumed by the air moving device provided inside the main body passes, and configured to collect contaminants charged by the carbon fiber charging device from the air,
wherein the carbon fiber charging device comprises:
a carbon fiber electrode configured to generate electrons and charge contaminants,
a protective case including a top wall facing a tip of the carbon fiber electrode and provided with a through hole and a side wall surrounding an outer circumferential surface of the carbon fiber electrode, the protective case being fixed to the main body, and an electron generation stabilization apparatus provided in the protective case and configured to adjust a potential gradient around the carbon fiber electrode and allow the carbon fiber electrode to generate the electrons stably, and wherein the electron generation stabilization apparatus includes an inclined surface provided in an inner side surface of the through hole and inclined to diverge toward an outside of the protective case.

17. The electrical appliance as claimed in claim 16, wherein the carbon fiber charging device includes a plurality of carbon fiber charging devices disposed at a predetermined interval on the edge of the inlet.

18. The electrical appliance as claimed in claim 16, wherein the electron generation stabilization apparatus comprises:
   an inclined surface provided on an inner side surface of the through hole of the protective case and inclined to diverge outward; and
   a ventilation path formed in a lower portion of the protective case to communicate with the through hole of the top wall, wherein outside air flows through the ventilation path.

19. The electrical appliance as claimed in claim 16, wherein the electrical appliance comprises at least one of an air conditioner, an air cleaner, a dehumidifier, a humidifier, a clothes manager, a refrigerator, or a dryer.

\* \* \* \* \*